United States Patent [19]
Daum et al.

[11] Patent Number: 5,435,820
[45] Date of Patent: Jul. 25, 1995

[54] WATER/STEAM-COOLED U-BEAM IMPACT TYPE PARTICLE SEPARATOR

[75] Inventors: Edward D. Daum, Washington Township, Stark County; Daniel R. Rowley, Alliance, both of Ohio

[73] Assignee: The Babcock & Wilcox Company, New Orleans, La.

[21] Appl. No.: 308,862

[22] Filed: Sep. 19, 1994

Related U.S. Application Data

[62] Division of Ser. No. 127,865, Sep. 28, 1993, Pat. No. 5,378,253.

[51] Int. Cl.⁶ .................. B01D 35/18; B01D 45/08
[52] U.S. Cl. .................. 55/269; 122/4 D; 165/104.12; 165/134.1; 422/146
[58] Field of Search .......... 55/269, 443, 444, 462; 96/146, 150; 95/283; 165/104.12, 134.1; 110/216, 245; 122/4 D; 422/146

[56] References Cited

U.S. PATENT DOCUMENTS

| | | | |
|---|---|---|---|
| 1,884,777 | 10/1932 | Lucke | 55/269 |
| 3,296,773 | 1/1967 | Hemstreet | 55/269 X |
| 4,312,302 | 1/1982 | Kollerup | 122/4 D |
| 4,538,549 | 9/1985 | Stromberg | 122/4 D |
| 4,559,787 | 12/1985 | Batzer et al. | 55/269 X |
| 4,686,939 | 8/1987 | Stromberg | 122/4 D |
| 4,819,717 | 4/1989 | Ishikawa et al. | 165/104.12 |
| 4,951,611 | 8/1990 | Abdulally et al. | 122/4 D |
| 4,961,761 | 10/1990 | Johnson | 55/269 |
| 4,992,085 | 2/1991 | Belin et al. | 55/444 |
| 5,025,755 | 6/1991 | Eickvonder et al. | 122/4 D |
| 5,064,621 | 11/1991 | Uyama et al. | 422/146 X |
| 5,094,191 | 3/1992 | Garkawe et al. | 122/4 D |
| 5,103,773 | 4/1992 | Andersson et al. | 122/4 D |
| 5,226,936 | 7/1993 | Garkawe | 55/269 |
| 5,250,091 | 10/1993 | Nigsch et al. | 55/269 |
| 5,277,151 | 1/1994 | Paulhamus | 110/245 X |
| 5,281,398 | 1/1994 | Hyppanen et al. | 55/269 X |
| 5,378,253 | 1/1995 | Daum et al. | 55/269 |

OTHER PUBLICATIONS

"Coal-Fired CFB Boilers With An Alternate Particle Collector", Alexander & Walker, Presented to Pittsburgh Coal Conference, Sep. 10-14, 1990-B & W Technical Paper BR 1422-Entire Paper.

"Circulating Fluidized Bed Boiler Solids System With In-Furnace Particle Separator", Belin & Flynn, Proceedings Of The 1991 Intl. Conf. on Fluidized Bed Combustion-Montreal Apr. 21-24, 1991, pp. 287-294.

"Coal-Fired CFB Boilers-Babcock & Wilcox's Experience", Belin, Price & Warrick, Presented to Intl. Joint Power Generation Conf.-San Diego. Calif.-Oct. 6-10, 1991 Entire Paper.

*Primary Examiner*—Richard L. Chiesa
*Attorney, Agent, or Firm*—Robert J. Edwards; Eric Marich

[57] ABSTRACT

An apparatus for separating solids from a solids and gas flow in a combustor having a fluid circulating system uses a plurality of separators adjacently positioned and horizontally spaced in a path of a solids and gas flow. Each separator includes four tubes. A membrane connected between selected tubes creates a concave-shaped configuration that will capture oncoming solids particles entrained within the flue gas. In one embodiment, fluid from the fluid circulating system flows serially from an inlet into a first leading tube of a first separator through the tubes in each separator in a given row and finally through the second leading vertical tube of a last separator in that row to an outlet and back to the fluid circulating system. Connector tubes communicate with the first leading tube and the first rear tube, the first rear tube and the second rear tube, and the second rear tube and the second leading tube. A separator connector communicates with the second leading tube of one separator and the first leading tube of an adjacent separator. In another embodiment, fluid flows through all of the separators of a given row in parallel by means of inlet and outlet transverse headers.

3 Claims, 7 Drawing Sheets

WATER/STEAM-COOLED U-BEAM IMPACT TYPE PARTICLE SEPARATOR

This is a division of application Ser. No. 08/127,865, filed Sep. 28, 1993, now U.S. Pat. No. 5,378,253.

FIELD AND BACKGROUND OF THE INVENTION

The present invention relates in general to apparatus for separating solids which are entrained within a flue gas flowing within a circulating fluidized bed (CFB) boiler. In particular, the present invention relates to a new and useful apparatus for separating solids from the flue gas using a U-beam impact type particle separator array integrated with the water and/or steam circuit of a CFB boiler enclosure.

In the CFB power plant field, the separation of solids which are entrained within the flue gas, and the recycle system for returning these solids to a bed of the CFB boiler, are critical to the efficient operation of the boiler. The separation and recycle system has a great impact on the capital and operating costs of the CFB boiler and its ability to follow variations in loads.

Figure 1:
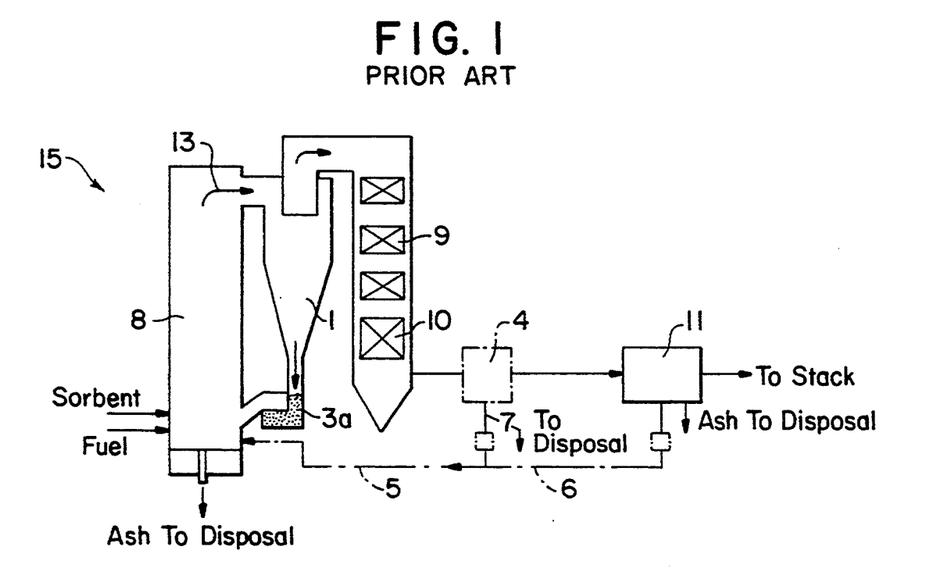
FIG. 1 is a schematic view of a known CFB boiler design employing a cyclone particle separator system.
Figure 2:
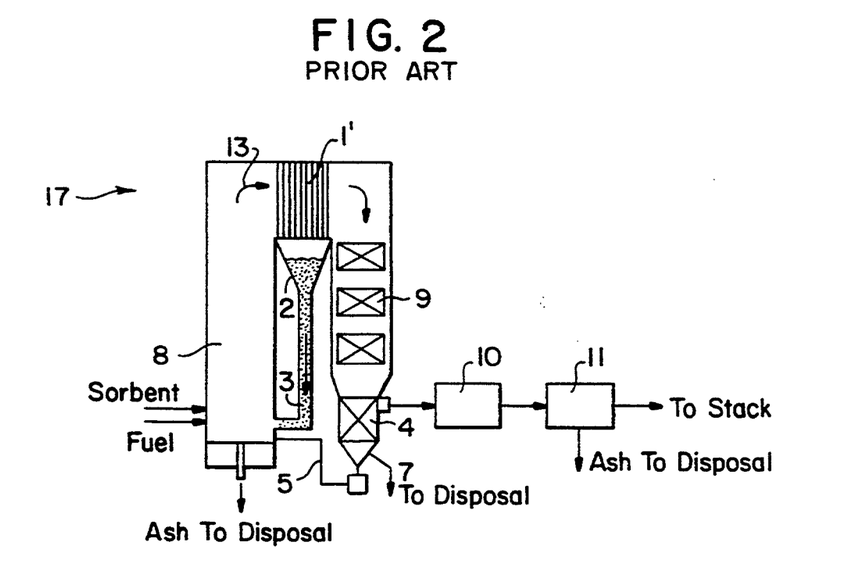
FIG. 2 is a schematic view of another known CFB boiler design employing an impact type particle separator system.

Presently known systems for separating the solids from the flue gas in a CFB boiler include a cyclone particle separator system (FIG. 1) and an impact type particle separator system (FIG. 2). In FIG. 1, a cyclone particle separator system 15 uses a cyclone primary separator 1, in conjunction with a furnace 8 which channels solids/gas flow 13 to the cyclone primary separator 1. Solids are collected by the cyclone primary separator 1 and recycled to the furnace 8 through a non-mechanical valve known as a loop seal 3a. The known CFB boilers having the cyclone separator system 15 also employ convection surfaces 9, air heaters 10 and secondary solids and recycle systems such as a secondary collector 4, a secondary collector purge 7, a secondary recycle line means 5, a baghouse 11, and a baghouse recycle line means 6.

In FIG. 2, an impact type particle separator system 17 uses an impact primary particle separator 1' in conjunction with a furnace 8 which channels solids/gas flow 13 to the impact type primary particle separator 1'. Solids are collected by the impact type particle separator 1', stored in a particle storage hopper 2 for collecting the solids, and recycled to the furnace 8 by means of an L-valve 3.

U.S. Pat. No. 4,992,085 to Belin et al. discloses an internal impact type particle separator employing a plurality of U-shaped impingement members organized in at least two staggered rows and positioned in the stream of a flue gas for entraining solid particles.

U.S. Pat. No. 5,025,755 to Eickvonder et al. discloses a labyrinth separator having staggered beams having essentially a U-shaped cross-section configuration. The labyrinth separator is located in a top region of the fluidized bed reactor.

U.S. Pat. No. 4,951,611 to Abdulally et al. discloses an internal solids separator system comprising a plurality of separator tubes which are water or steam cooled. The tubes have a pair of fins extending from diametrically opposed portions of the tubes for entraining solids from the gases.

SUMMARY OF THE INVENTION

The present invention pertains to an apparatus for separating solids from a solids and gas flow in a circulating fluidized bed (CFB) boiler in which the boiler employs a fluid circulating system, particularly a water and/or steam circulating system.

According to a first embodiment, one aspect of the present invention is drawn to an apparatus for separating solids from a solids and gas flow in a combustor having a fluid circulating system. A plurality of separators are adjacently positioned and horizontally spaced in a path of a solids and gas flow. Each separator comprises four vertical or substantially vertical tubes (hereinafter referred to as vertical tubes); a first leading vertical tube, a second leading vertical tube horizontally spaced from the first leading vertical tube, a first rear vertical tube horizontally spaced from the first leading vertical tube, and a second rear vertical tube horizontally spaced from the second leading vertical tube. Each separator also comprises a connector communicating with the first leading vertical tube and the first rear vertical tube, a connector communicating with the first rear vertical tube and the second rear vertical tube, and a connector communicating with the second rear vertical tube and the second leading vertical tube.

A membrane is connected between the first leading vertical tube and the first rear vertical tube, between the first rear vertical tube and the second rear vertical tube, and between the second rear vertical tube and the second leading vertical tube to create a concave-shaped configuration that will capture the oncoming solids particles entrained within the flue gas.

The first leading vertical tube of a first separator communicates with the fluid circulating system and the second leading vertical tube of a last separator also communicates with the fluid circulating system. A separator connector communicates with the second leading vertical tube of one separator and the first leading vertical tube of an adjacent separator. By connecting the adjacent separators with the fluid circulating system, the tubes and the connectors of the separators allow for the passing of fluid from the fluid circulating system through each separator and back into the fluid circulating system which allows for an efficient cooling of the separator tubes and connectors.

The plurality of separators are arranged in the path of the solids and gas flow in staggered rows.

According to a second embodiment, another aspect of the present invention is drawn to an apparatus for separating solids from a solids and gas flow in a combustor having a fluid circulating system. Again, a plurality of separators are adjacently positioned and horizontally spaced in a path of a solids and gas flow. Each separator comprises four vertical or substantially vertical tubes (hereinafter referred to as vertical tubes); a first leading vertical tube, a second leading vertical tube horizontally spaced from the first leading vertical tube, a first rear vertical tube horizontally spaced from the first leading vertical tube, and a second rear vertical tube horizontally spaced from the second leading vertical tube.

A membrane is again connected between the first leading vertical tube and the first rear vertical tube, between the first rear vertical tube and the second rear vertical tube, and between the second rear vertical tube and the second leading vertical tube to create a concave-shaped configuration that will capture the oncoming solids particles entrained within the flue gas.

In contrast to the previous embodiment, however, an upper end of each of the vertical tubes forming each separator is connected to and fluidically communicates with an upper header of the fluid circulating system, while a lower end of each of the vertical tubes forming each separator is connected to and fluidically communicates with a lower header of the fluid circulating system. By fluidically connecting adjacent separators with the fluid circulating system in the same manner, a plurality of parallel fluid flow paths between the lower and upper headers is created, allowing fluid from the fluid circulating system to flow through and cool each separator in parallel.

The plurality of separators are again arranged in the path of the solids and gas flow in staggered rows.

The various features of novelty which characterize the invention are pointed out with particularity in the claims annexed to and forming a part of this disclosure. For a better understanding of the invention, its operating advantages and specific results attained by its uses, reference is made to the accompanying drawings and descriptive matter in which a preferred embodiment of the invention is illustrated.

DESCRIPTION OF THE PREFERRED EMBODIMENTS

Figure 3:
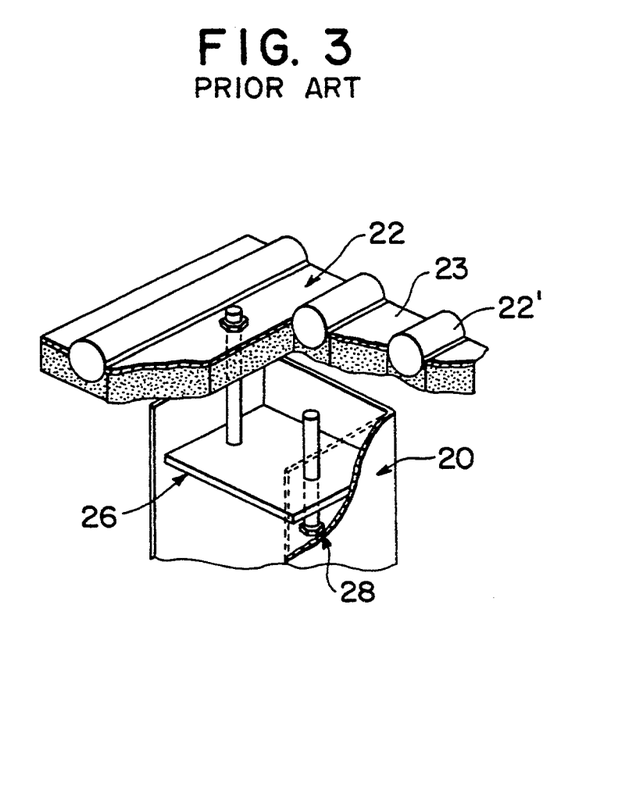
FIG. 3 is a view illustrating the support connection of a known U-beam used in an impact type particle separator system.
Figure 4:
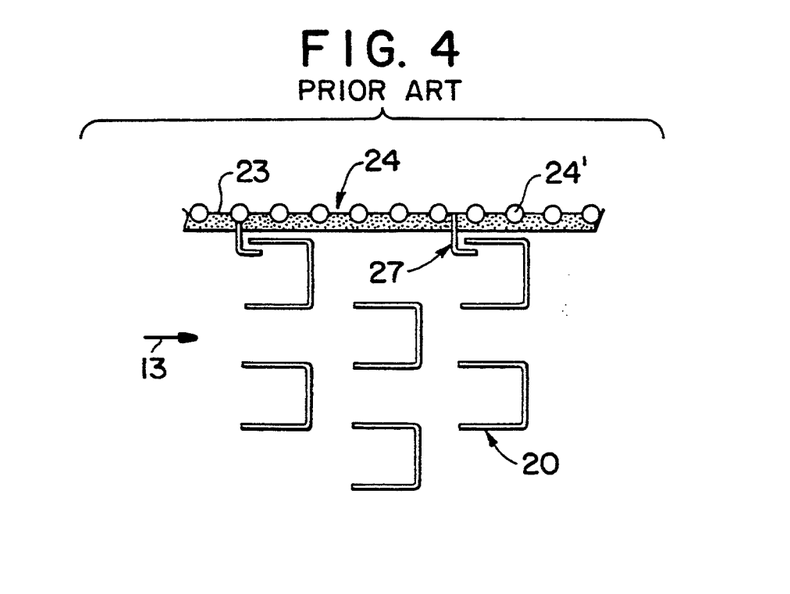
FIG. 4 is a top view of the known U-beam impact type particle separator system.

FIG. 4 illustrates a known impact type particle separator system using a plurality of U-beams 20 which are positioned in a solid/gas flow stream 13 for collecting solids. A seal baffle 27 is connected to a side wall membrane panel 24 for sealing the gas path 13 to prevent gas bypassing the U-beams 20. FIG. 3 shows the U-beam 20 connected to a roof membrane panel 22 through the use of a support plate 26 and a support bolt 28 bolted to the roof panel 22. Both the roof membrane panel 22 and the side wall membrane panel 24 are typically comprised of fluid cooled tubes 22', 24' respectively, separated by a metal membrane 23 to create a gas tight enclosure wall. Despite the fact that the U-beams 20 are constructed of stainless steel, they have been known to warp under high temperatures.

Figure 5:
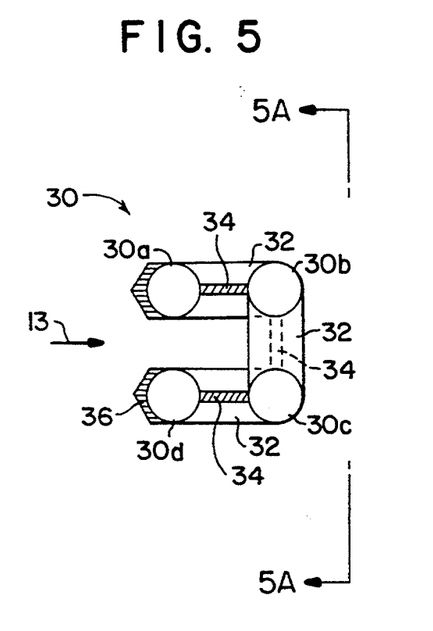
FIG. 5 is a top view of a first embodiment of a separator according to the present invention.

The present invention alleviates the problems associated with the known stainless steel U-beams by employing a tube and membrane wall construction similar to that used for the boiler enclosure which allows for the cooling of the U-beams with the same fluid as that passing through the tubes forming the fluid circulating circuits of the CFB reactor or boiler enclosure. The fluid is typically water, steam, or a mixture of water and steam. A first embodiment of the separator 30 according to the present invention is illustrated in FIG. 5. Separator 30 is comprised of a plurality of vertical or substantially vertical tubes (hereinafter referred to as vertical tubes); namely, a first leading vertical tube 30a and a second leading vertical tube 30d horizontally spaced from the first leading tube 30a. A first rear vertical tube 30b is horizontally spaced from the first leading tube 30a and a second rear vertical tube 30c is horizontally spaced from the first rear vertical tube 30b and horizontally spaced from the second leading vertical tube 30d.

Figure 5A:
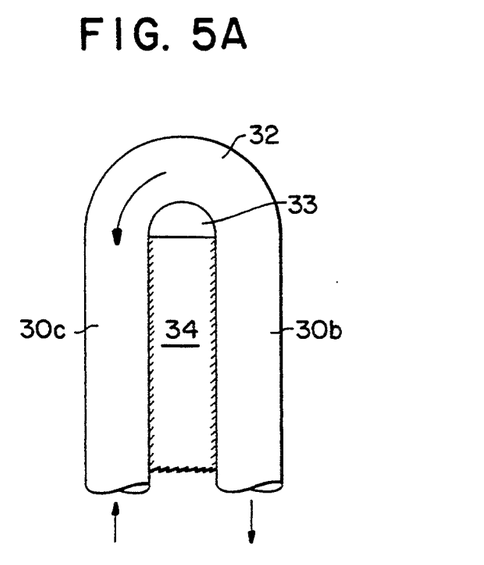
FIG. 5A is an end view of the separator of FIG. 5 taken in the direction of arrows 5A—5A of FIG. 5.

A connector tube 32 communicates between the tubes 30a and 30b, 30b and 30c, and 30c and 30d. Additionally, a membrane or web 34 is connected by welding or other suitable means between the vertical tubes 30a and 30b, 30b and 30c, and 30c and 30d, and extends along substantially the entire length of these tubes 30a–30d. If desired, the membrane 34 may also be connected to each connector tube 32 connected to tubes 30a and 30b, 30b and 30c, and 30c and 30d, to eliminate any gap 33 at these locations as shown by way of representative example and not of limitation in FIG. 5A. In any event, the membrane 34 connected between the various tubes 30a and 30b, 30b and 30c, and 30c and 30d cooperates with these tubes to create a concave-shaped configuration which traps or captures oncoming solids particles entrained within the flue gas and causes them to fall downwards out of the solids/gas flow path 13. It is preferred that this concave-shaped configuration be U-shaped, but other concave-shaped configurations such as V-shaped or C-shaped could also be employed without departing from the teachings of the present invention. The separator 30 according to the present invention is positioned in the solid/gas flow path 13 such that the first and second leading vertical tubes 30a and 30d are first contacted by the flow 13. If necessary, erosion guards or shields 36 are provided on the first and second leading vertical tubes 30a and 30d for protecting the tubes from potential erosion caused by the impacting solids entrained within the solid/gas flow 13. The erosion guards 36 can be made of any suitable, erosion-resistant material such as a refractory, ceramic or steel material.

Figure 6:
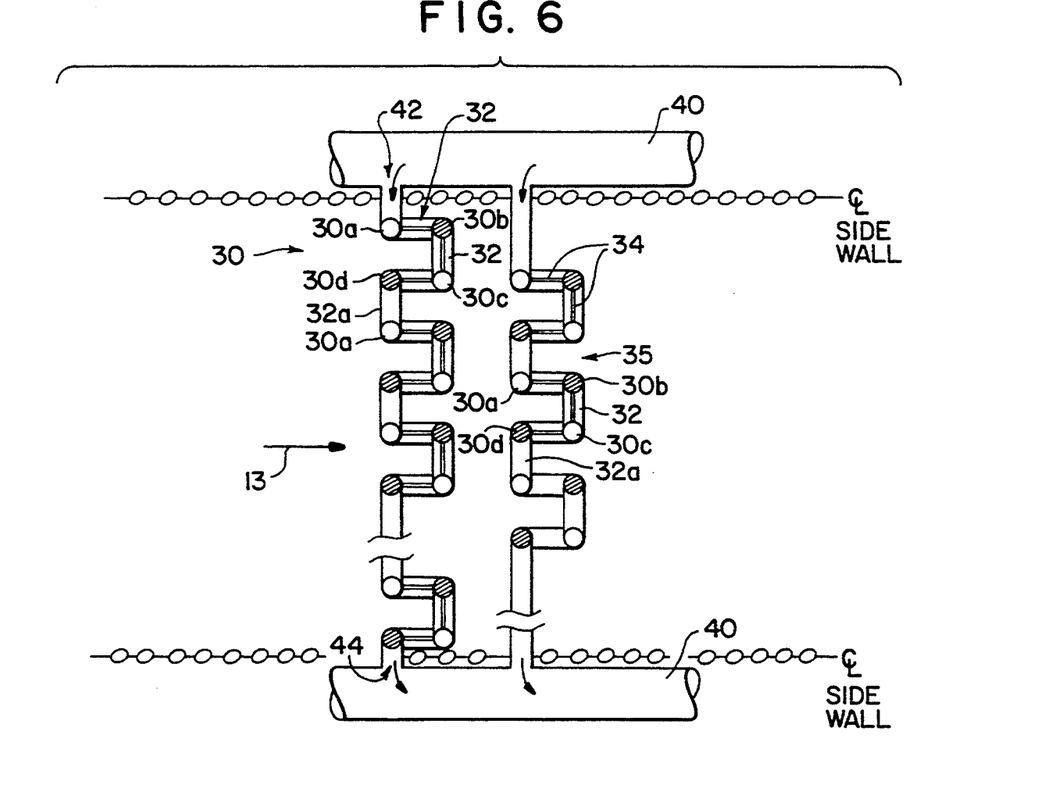
FIG. 6 is a top sectional view of a first embodiment of the separator system according to the present invention, taken in the direction of arrows 6—6 of FIG. 7.

FIG. 6 illustrates a top view of the present invention wherein several separators 30 are arranged in a plurality of rows 35, and in which the rows 35 of separators 30 communicate with the fluid circulating system of the CFB. In this preferred embodiment, the fluid circulating system is a water and/or steam circulating system and will be referred to as such. The water and/or steam circulating system comprises headers 40 and an inlet 42 communicating with one header 40 and a first leading vertical tube 30a of a first separator 30 in a row 35, and an outlet 44 communicating with a second header 40 and communicating with a second leading vertical tube 30d of a last separator 30 and the second header 40. The water and/or steam flow is thus serially through each separator 30 in a given row 35, from the inlet 42 to the outlet 44. In FIG. 6, the "open" circles shown for tubes 30a and 30c, for example, schematically indicate that the flow of water and/or steam therein is "into" the plane of the page having FIG. 6 thereon. The "cross-hatched" circles shown for tubes 30b and 30d, for example, schematically indicate that the flow of water and/or steam therein is "out of" the plane of the page having FIG. 6 thereon. The rows 35 of separators 30 are preferably arranged in a staggered configuration. A separator connector 32a communicates between adjacent separators 30 by connecting the second leading vertical tube 30d of one separator 30 with the first leading vertical tube of 30a of an adjacent separator 30. The staggered configuration, according to the present invention, provides that each row 35 is horizontally and laterally spaced from a preceding row 35 in the solids/gas flow path 13. The separators 30 of each row are aligned behind the separator connectors 32a of a preceding row 35.

There are several variations to integrating the present invention into the fluid circulating system of a CFB boiler enclosure. A first embodiment is shown in FIG. 6, and provides for a connector tube 32 provided between the tubes 30a and 30b and the tubes 30d and 30c at a lower end of the tubes. Additionally, the connector tube 32 between the tubes 30b and 30c is provided at an upper end of the tubes 30b and 30c. The separator connectors 32a are provided at an upper end of the tubes 30d and 30a of adjacent separators 30.

Fluid such as water and/or steam flows from the inlet 42 of the header 40 into the top of the first leading tube 30a. The fluid is then channeled downward through the tube 30a to the bottom of the tube 30a and undergoes a 180 degree turn at connector 32 which connects the first leading edge tube 30a with the back corner tube 30b of that U-beam. The flow is then channeled upward in the back corner tube 30b, and undergoes another 180 degree turn at connector 32 connected to the second back corner tube 30c flowing downward through tube 30c and turning 180 degrees for flowing through connector 32 and then flowing upward through the second leading edge tube 30d. Flow through the remainder of the U-beams in the row 35 is in identical fashion to flow through the first U-beam as described above.

Figure 7:
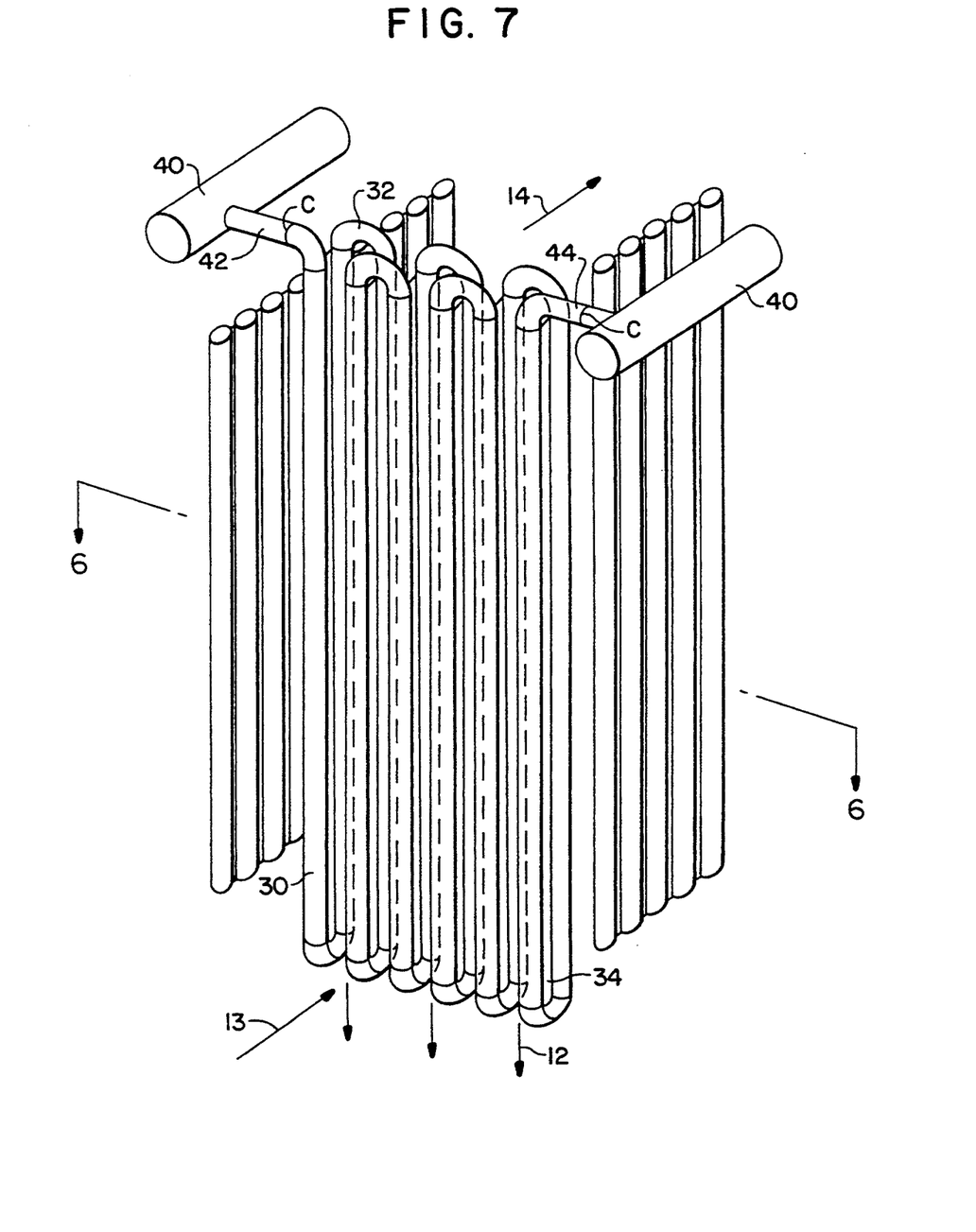
FIG. 7 is a perspective view of the first embodiment of the separator system according to the present invention.

FIG. 7 illustrates the collection of the solids 12 from the solids/gas flow 13 after engaging the separator arrangement according to the present invention. A flow of clean gas 14 exits the system.

The gas temperature of the solids/gas flow 13 and the operating metal temperatures of the known U-beam arrays under normal operating conditions is in the 1500°–1600° F. range. Upset conditions could cause temperature excursions (>1750° F.) in the region of the U-beams resulting in severe warpage of the U-beams and a subsequent decrease in solids collection efficiency. The cooled, membrane wall U-beam array of the present invention significantly reduces the potential for U-beam warpage.

In the known impact type particle separator systems, materials considerations dictate the maximum height of a stainless steel U-beam operating at 1500°–1600° F., given that the strength of the U-beam decreases with increasing temperature. In contrast, there is no height limitation due to strength at operating temperature with the cooled U-beam impact type particle separators 30 of the present invention. One major benefit derived from the present invention is its ease of fabrication as compared to other designs. As those skilled in the art will appreciate, the present invention can be fabricated in a manner similar to that currently employed in the fabrication of the membrane wall enclosure sections of a CFB boiler. The U-beams 30 of the present invention can be employed as either evaporator (boiler) or superheater/reheater surface. This permits the design of larger CFB boilers by using the cooled U-beams 30 of the present invention as compared with the known uncooled U-beams.

Accessibility for repair and maintenance is another benefit of the present invention. Since the cooled U-beams 30 are hung from or attached to headers 40 located at the top of the boiler, a row 35 of U-beams 30 needing repair or replacement can be easily removed from the top of the CFB simply by cutting the inlet and outlet tube 42, 44 (see FIG. 7) at C and removing it through the roof of the CFB boiler.

Figure 8:
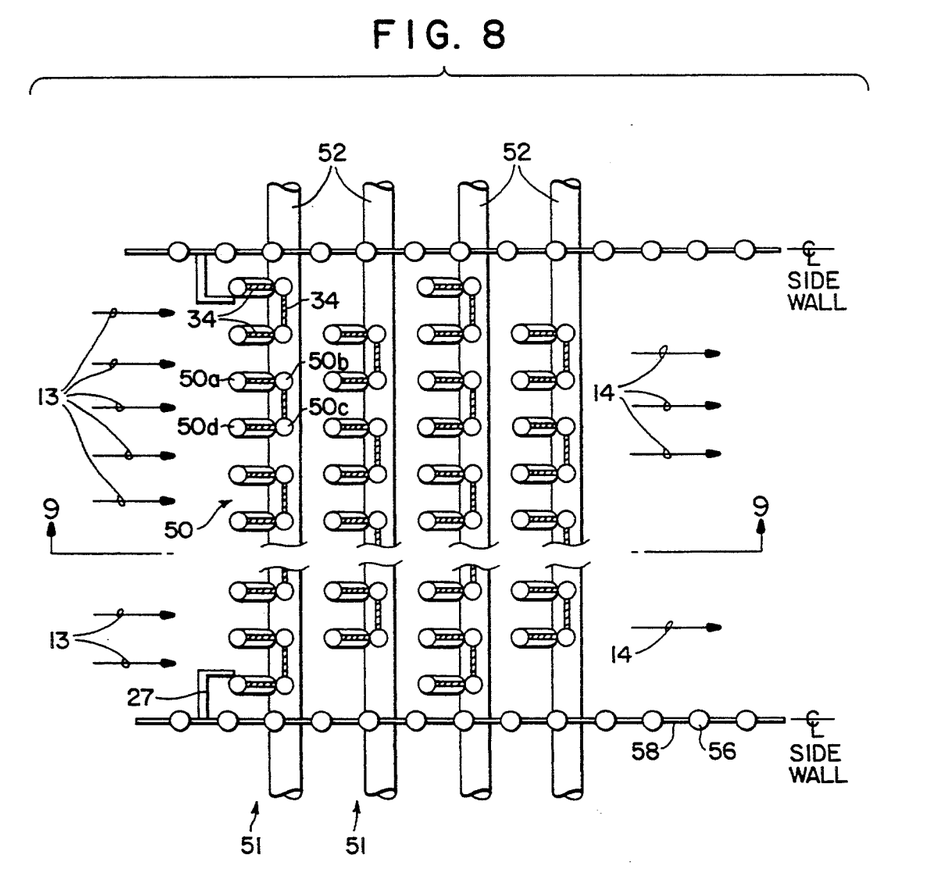
FIG. 8 is a top view of a second embodiment of a separator system according to the present invention.

As indicated earlier, another approach could be utilized to integrate the present invention into the fluid circulating system of a CFB boiler enclosure. This second embodiment shown in FIGS. 8–10 of the present disclosure. As shown therein, in this configuration, each row 51 of U-beams would be connected to its own lower (and in this case, inlet) transverse header 52 and its own upper (and in this case, outlet) transverse heater 54. This type of configuration would probably be more suitable for natural circulation of a water/steam mixture being conveyed therein from the lower transverse header 52 to the upper transverse header 54. The upper and lower transverse headers 52, 54 are referred to as such because they would be oriented substantially perpendicular to the flow of gas 13, along each row 51 of separators 50. Preferably the lower and upper transverse headers 52, 54 would be located out of the solids/gas flow 13 to minimize erosion of same. As shown in FIG. 8, a plurality of individual separators 50 are provided, each having a first leading vertical tube 50a, and a second leading vertical tube 50d, horizontally spaced from the first leading vertical tube 50a. A first rear vertical tube 50b is horizontally spaced from the first leading vertical tube 50a while a second rear vertical tube 50c is horizontally spaced from the second leading vertical tube 50d. In contrast to the first embodiment, wherein the fluid flows through each of the tubes 30a, 30b, 30c, and 30d, in series, fluid flow in the tubes of each separator 50 occurs in parallel in each individual tube 50a, 50b, 50c, and 50d, upwardly from the lower (inlet) transverse header 52 to the upper (outlet) transverse header 54. Membrane 34 is emplaced between the tubes 50a and 50b, 50b and 50c, and 50c and 50d to create a concave-shaped configuration that will trap oncoming particles entrained within the solids/gas path 13. Again, if necessary, erosion guards or shields can be emplaced on the leading edge tubes 50a, 50d of each separator 50.

Figure 9:
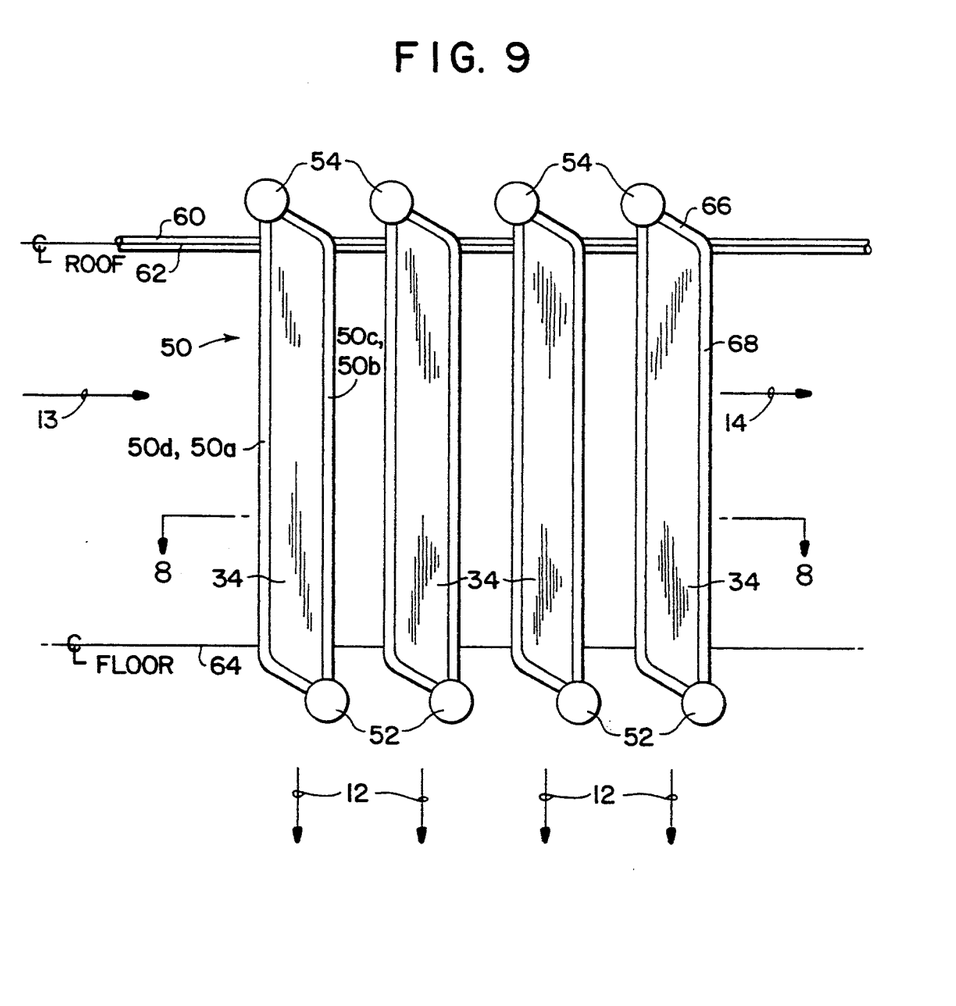
FIG. 9 is a side view of the second embodiment of the separator system of FIG. 8, taken in the direction of arrows 9—9 of FIG. 8.
Figure 10:
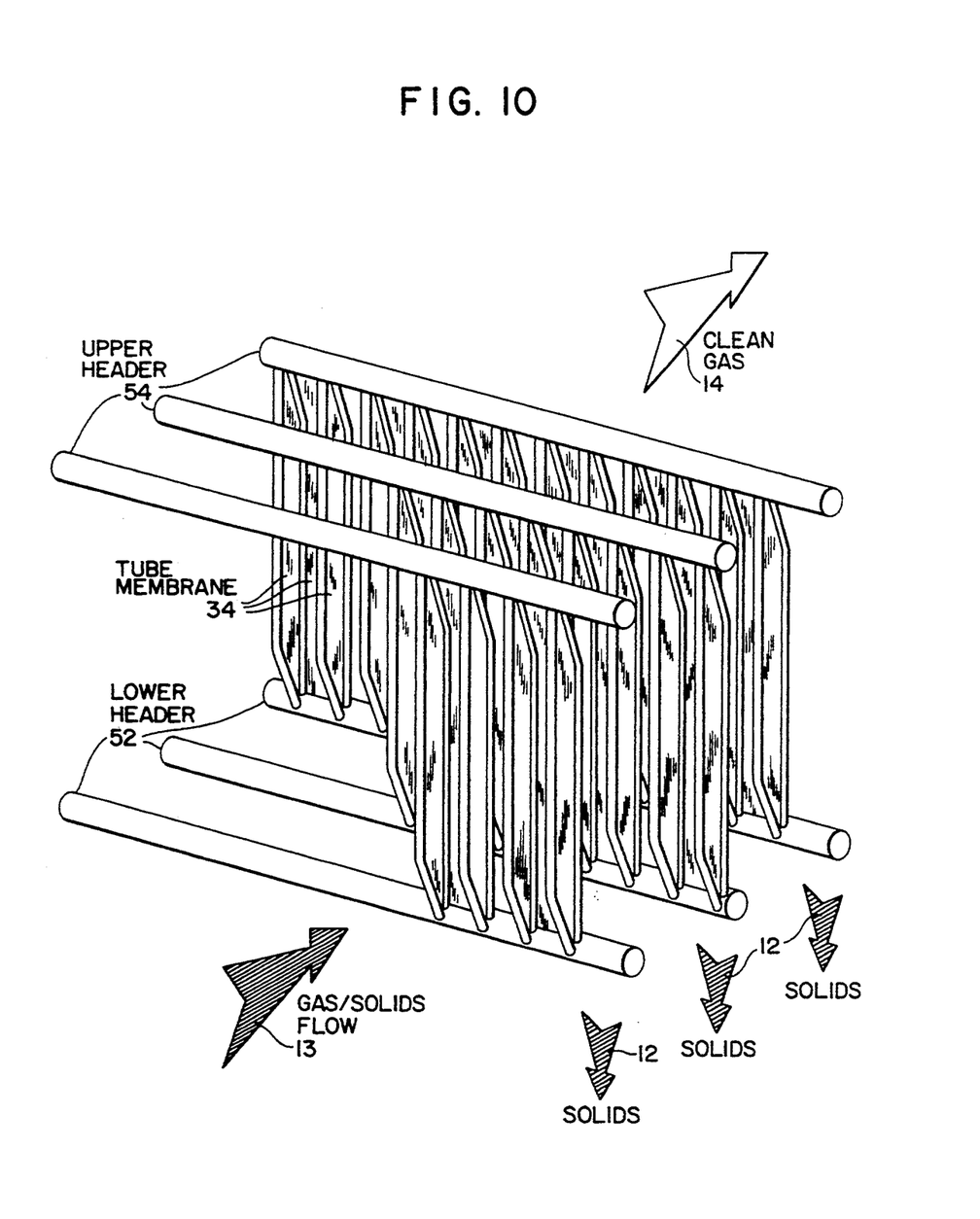
FIG. 10 is a perspective view of the second embodiment of the separator system according to the present invention.

Depending upon a number of considerations, the flow through each individual separator 50 may be accomplished by either forced or natural circulation. In a natural circulation application, it is preferred that the lower transverse headers 52 are the inlet headers and the upper transverse headers 54 are the outlet headers. Of course, these inlet and outlet locations could be reversed if forced circulation is employed, or off the working fluid in the separators 50 is steam. The particular type of fluid flowing through the separators 50 is selected to meet the demands of any particular application.

As shown in FIGS. 8 and 9, the side walls containing the array of separators 50 are generally comprised of tubes 56 also separated by membrane 58; these side walls could be water and/or steam cooled. Similarly, as shown in FIG. 9, the roof enclosure could be an arrangement of tubes 60 separated by membrane 62. The floor 64 would probably also be comprised of such a fluid-cooled construction.

Another advantage of the second embodiment is that each of the tubes 50a, 50b, 50c, and 50d are identical to each other, each having a bent portion 66 and a straight portion 68. By this construction, only a single type of tube needs to be fabricated to interconnect the lower transverse headers 52 and the upper transverse headers 54, resulting in a simple and economical design for the separators 50.

Again, a plurality of additional rows 51 and separators 30 could be provided, each additional row 51 being horizontally spaced from a preceding row 51. Each additional row 51 would be provided with its own upper and lower transverse headers 52, 54. If desired, fluid from the fluid circulating system can be provided from an outlet transverse header of a first row 51 to an inlet transverse header of a second row 51. These interconnections could continue on through the last row 51 of separators. The size and type of interconnecting piping (not shown) provided between each row 51 would be chosen to achieve a desired pressure drop and/or flow distribution necessary to "mix out" any imbalances in heat absorption by the fluid. By way of example, this could include single or double end outlet-/inlet piping between the transverse headers 52, 54, or various types of single or multiple TEE connections between these transverse headers 52, 54.

While specific embodiments of the invention have been shown and described in detail to illustrate the application of the principles of the invention, it will be understood that the invention may be embodied otherwise without departing from such principles.

We claim:

1. An apparatus for separating solids from a solids and gas flow in a combustor having a fluid circulating system, the apparatus comprising:

a plurality of separators adjacently positioned and horizontally spaced in a path of a solids and gas flow, each separator including a first leading vertical tube, a second leading vertical tube horizontally spaced from the first leading vertical tube, a first rear vertical tube horizontally spaced from the first leading vertical tube, and a second rear vertical tube horizontally spaced from the second leading vertical tube;

a membrane connected between the first leading vertical tube and the first rear vertical tube, between the first rear vertical tube and the second rear vertical tube, and between the second rear vertical tube and the second leading vertical tube to create a concave-shaped configuration that will capture oncoming solids particles entrained within the gas; and wherein the separators are arranged in at least one row and lower ends of each of the tubes forming the separators in one row fluidically communicate with a lower transverse header of the fluid circulating system for that row and upper ends of said tubes fluidically communicate with an upper transverse header of the fluid circulating system for that row, creating a plurality of parallel flow paths between the transverse headers, the tubes and the transverse headers for passing fluid from the fluid circulating system through each separator in parallel and back into the fluid circulating system.

2. The apparatus according to claim 1, including a plurality of additional rows and separators in a path of a solids and gas flow, each additional row being horizontally spaced from a preceding row and having an upper and a lower transverse header.

3. The apparatus according to claim 1, wherein fluid from the fluid circulating system is provided to an inlet transverse header of a first row of separators, through said separators of that row to an outlet transverse header of said first row of separators, and from said outlet transverse header of said first row of separators to an inlet transverse header of a second row of separators.

* * * * *